(12) United States Patent
Matsuzaki (10) Patent No.: US 7,392,875 B2
(45) Date of Patent: Jul. 1, 2008

(54) FOUR-WHEEL DRIVE SYSTEM

(75) Inventor: Norikazu Matsuzaki, Mito (JP)

(73) Assignee: Hitachi, Ltd., Tokyo (JP)

( * ) Notice: Subject to any disclaimer, the term of this patent is extended or adjusted under 35 U.S.C. 154(b) by 136 days.

(21) Appl. No.: 11/017,724

(22) Filed: Dec. 22, 2004

(65) Prior Publication Data

US 2005/0150702 A1   Jul. 14, 2005

(30) Foreign Application Priority Data

Dec. 25, 2003   (JP)   ............................. 2003-430149

(51) Int. Cl.
*B60K 17/354* (2006.01)
*B60T 7/12* (2006.01)
(52) U.S. Cl. .................... 180/247; 180/248; 701/89; 701/72; 701/90
(58) Field of Classification Search ................. 180/247, 180/248; 701/89, 72, 90
See application file for complete search history.

(56) References Cited

U.S. PATENT DOCUMENTS

| | | | | |
|---|---|---|---|---|
| 5,016,724 | A * | 5/1991 | Steinhagen et al. | 180/197 |
| 5,245,542 | A * | 9/1993 | Itoh et al. | 701/90 |
| 5,734,595 | A * | 3/1998 | Matsuno | 701/104 |
| 5,961,565 | A * | 10/1999 | Kawabe et al. | 701/90 |
| 6,161,641 | A * | 12/2000 | Fukumura et al. | 180/197 |
| 6,535,809 | B1 * | 3/2003 | Beyer et al. | 701/84 |
| 6,698,541 | B2 * | 3/2004 | Sakakiyama | 180/233 |
| 6,859,715 | B2 * | 2/2005 | Lee et al. | 701/89 |

FOREIGN PATENT DOCUMENTS

| | | |
|---|---|---|
| EP | 0 189 165 A2 | 7/1986 |
| EP | 0 218 839 A2 | 4/1987 |
| EP | 1 205 327 A2 | 5/2002 |
| JP | 62-60936 A | 3/1987 |
| JP | 62-121839 A | 6/1987 |
| JP | 8-182118 A | 7/1996 |

(Continued)

OTHER PUBLICATIONS

European Search Report dated Sep. 11, 2006 (Three (3) pages).

(Continued)

*Primary Examiner*—Tony Winner
*Assistant Examiner*—Marlon Arce-Diaz
(74) *Attorney, Agent, or Firm*—Crowell & Moring LLP (57) ABSTRACT

To provide a four-wheel drive system which improves running performance of an automotive vehicle by inhibiting a driving torque from becoming insufficient upon occurrence of a slip.

An R slip sensing means of a DC motor torque calculating means senses a slip due to a spin of rear wheels. When the rear wheel slip is sensed, an R slip DC-motor-torque correcting means corrects a torque of the rear wheels so that a driving force of the rear wheels is reduced and then increased. The R slip DC-motor-torque correcting means reduces a driving torque of the rear wheels to eliminate the slip and holds the reduced driving torque until the slip is eliminated, and then increases the driving torque to a value lower than a value which the driving torque has taken at the time of occurrence of the slip. The driving torque is increased to a predetermined limit value depending on the number of slips.

9 Claims, 9 Drawing Sheets

FOREIGN PATENT DOCUMENTS

| JP | 2000-238549 | * | 5/2000 |
|----|-------------|---|--------|
| JP | 2000-238549 A | | 9/2000 |
| JP | 2002-67723 | | 3/2002 |
| JP | 2002-347477 A | | 12/2002 |
| JP | 2005-184998 A | | 7/2005 |

OTHER PUBLICATIONS

Japanese Office Action dated Feb. 6, 2007 with English translation (Seven (7) Pages).

* cited by examiner

TABLE OF LIMIT DRIVING TORQUE
DEPENDING ON SLIP NUMBERS

| NUMBER N OF SLIPS | 1 | 2 | 3 | 4 | 5 | 6 |
|---|---|---|---|---|---|---|
| LIMIT DRIVING TORQUE LT | 320 | 240 | 200 | 160 | 160 | 160 |

FOUR-WHEEL DRIVE SYSTEM

CLAIM OF PRIORITTY

The present application claims priority from Japanese application serial no. 2003-430149, filed on Dec. 2, 2003) the content of which is hereby incorporated by reference into this application.

BACKGROUND OF THE INVENTION

The present invention relates to a four-wheel drive system for driving four wheels of an automotive vehicle, and particularly to a control of driving of the wheels at the time of the occurrence of a wheel slip.

As a conventional four-wheel drive system for an automotive vehicle, there is known a system sensing a slip of driving wheels and reducing the torque of the slipping wheels to inhibit the slip, as disclosed in JP-A-2002-67723, for instance.

However, since the system disclosed in JP-A-2002-67723 is based on a technique not taking account of the fact that the coefficient of dynamic friction is lower than the coefficient of static friction. Therefore it may be that when a torque applied to the slipping wheel is reduced upon sensing of the slip, the driving force becomes insufficient, thereby deteriorating the running performance of the vehicle.

SUMMARY OF THE INVENTION

It is an object to the present invention to provide a four-wheel drive system improvable the running performance by inhibiting the driving force from becoming insufficient when a slip of the driving wheels occurs.

(1) To attain the above object, the present invention provides the following four-wheel drive system. The system is able to control driving of four wheels of a four-wheel drive vehicle where torque is distributable to front wheels and rear wheels; further comprising a slip sensing means for sensing a slip of rear wheels due to a spin thereof; and a torque correcting means for correcting a torque on the rear wheels so that a driving force of the rear wheels whose slip is sensed by the slip sensing means is reduced and then increased.

According to this structure, the driving torque is inhibited from becoming insufficient upon occurrence of a slip, thereby improving the running performance.

(2) Preferably, the four-wheel drive system of the above paragraph (1), wherein the torque correcting means operates to reduce the driving torque of the rear wheels until the driving torque reaches to a lower level where the slip is eliminated when the slip of the rear wheels is sensed.

(3) Preferably, the four-wheel drive system of the above paragraph (2), wherein the torque correcting means operates to keep the reduced driving torque until the slip is eliminated and then to increase the driving torque when the slip of the rear wheels is sensed.

(4) Preferably, the four-wheel drive system of the above paragraphs (2), wherein the torque correcting means operates, when the slip of any of the rear wheels is sensed, to keep the driving torque as reduced for a predetermined time period and then to increase the driving torque.

(5) Preferably, the four-wheel drive system of the above paragraph (3) or (4), wherein the torque correcting means, after eliminating of the slip, operates to increase the driving torque lower than a value which the driving torque has taken at the time of occurrence of the slip.

(6) Preferably, the four-wheel drive system of the above paragraph (3) or (4), wherein the torque correcting means, at the increasing process of the driving torque, operates to increase that up to a predetermined limit value depending on the number of spinning rotations of the rear wheels and to allow repetition of the slip due to the spin and a grip so that a continuous slip is inhibited.

(7) Preferably, the four-wheel drive system of the above paragraph (3) or (4) is so that the torque correcting means operate, when the slip of the rear wheels is sensed, to reduce the driving torque of the rear wheels to 0 Nm.

(8) Further, to attain the above object, the invention also provides the following electric drive system for a four-wheel drive vehicle. That is, the electric drive system for a four-wheel drive vehicle comprises an electric motor for driving wheels other than wheels driven by an internal-combustion engine; a generator driven by the internal-combustion engine; and a control device for controlling the electric motor and the generator wherein the generator is exclusively used for generating electric power for driving the electric motor. The electric motor directly is supplied the electric power from the generator to output a driving force for wheels. And when the wheels driven by the electric motor slip, the driving torque of the slipping wheels is reduced until a value lower than that at the time of occurrence of the slip, and then raised higher than the reduced torque but lower than the torque at the time of occurrence of the slip. Further, when the slip remains even after the operation of the driving force of the wheels, the operation is continuously repeated under the condition that the raised driving torque is made lower than that in the last operation until the slip is eliminated.

According to this arrangement, the driving torque is inhibited from becoming insufficient upon occurrence of a slip, thereby improving the running performance.

DETAILED DESCRIPTION OF THE INVENTION

A structure and an operation of a four-wheel drive system according to one embodiment of the present invention will be described by referring to FIGS. 1 to 11.

First, an overall structure of a four-wheel drive vehicle using the system of the embodiment will be described by referring to FIG. 1.

Figure 1:
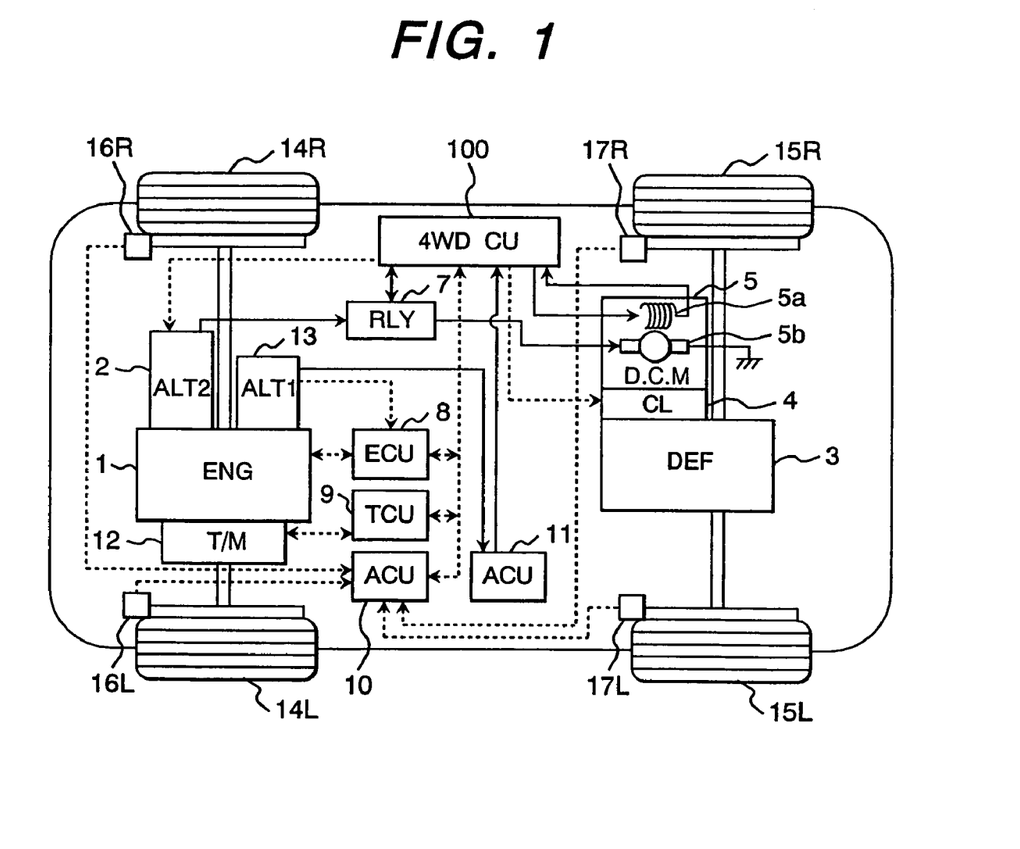
FIG. 1 is a system block diagram showing an overall structure of a four-wheel drive vehicle using a four-wheel drive system according to one embodiment of the invention.

FIG. 1 is a system block diagram showing the overall structure of the four-wheel drive vehicle using the four-wheel drive system of the embodiment of the invention.

The four-wheel drive vehicle is equipped with an internal combustion engine 1 and a DC motor 5. A driving force of the engine 1 is transmitted to a right-front and left-front wheels 14R, 14L via a transmission 12 and a first axle, to drive the front wheels 14R, 14L.

A driving force of the DC motor 5 is transmitted to the right-rear and left-rear wheels 15R, 15L via a clutch 4, a differential gear 3, and a second axle, to drive the rear wheels 15R, 15L. When the clutch 4 is connected with the differential gear 3, a torque of the DC motor 5 is transmitted to a rear axle via the clutch 4 and differential gear 3 to drive the rear wheels 15R, 15L. When the clutch 4 is disconnected from the differential gear 3, the DC motor 5 is mechanically decoupled from the rear wheels 15R, 15L and the driving force is not transmitted to the road surface from the rear wheels 15R, 15L. The connecting/disconnecting of the clutch 4 is controlled by a four-wheel drive control unit (4WDCU) 100. The DC motor 5 is, for instance, a DC shunt-wound motor easily switchable between its opposite rotating directions, or a separately excited DC motor.

In the four-wheel drive vehicle of the above description, the front wheels 14R, 14L are driven by the engine 1, while the rear wheels 15R, 15L are driven by the DC motor 5. However, it may be arranged so that the front wheels are driven by a DC motor, while the rear wheels are driven by an engine. Further, the vehicle may be a mechanical four-wheel drive vehicle, which is equipped with a driving force regulating means able to control the driving forces of the front and rear wheels without the DC motor, and allows the front and rear wheels to connect with the engine through a propeller shaft.

In an engine room, a regular generator (ALT1) 13 used for a usual charging/generating system and a battery 11 are mounted, which are also called as accessories (of an engine). The generator 13 is driven by the engine 1 through a belt and its output power is charged in the battery 11.

In the vicinity of the generator 13, there is disposed a high-power generator 2 for driving (ALT2) of DC motor. The high-power generator 2 is also driven by the engine 1 through a belt to output power for driving the DC motor 5. The output voltage of the high-power generator 2 (ALT2) is controlled by the 4WDCU (Control Unit for 4WD) 100. With a change in the generated output of the high-power generator 2 (ALT2), the DC motor torque as an output of the DC motor 5 changes.

The 4WDCU 100 sends an output-command [i.e., a duty signal which makes a field current of the generator (alternator) to take a desired value] to the high-power generator 2 (ALT2), thereby the output power of the high-power generator 2 (ALT2) changes. The output voltage of the high-power generator 2 (ALT2) is applied to an armature coil 5b of the DC motor 5 to change the output of the DC motor 5 (i.e., DC motor torque). The 4WDCU 100 controls the output (i.e., output power) of the high-power generator 2 to control the output of the DC motor 5 (i.e. DC motor torque). Further, in the high-speed range of the DC motor 5, the 4WDCU 100 performs a field-weakening control to the field current supplied to a field coil 5a of the DC motor 5, so that the DC motor 5 is directly controlled by the 4WDCU 100 to be able to operate at high speed.

The output of the engine 1 is controlled by an electric throttle device controlled under command from an engine control unit (ECU) 8. The electric throttle device is provided with an accelerator opening sensor (not shown) to detect the accelerator opening. If an accelerator pedal and a throttle which are mechanically linked are used instead of the electric throttle device, an accelerator opening sensor may be provided to the accelerator pedal. A transmission controller (TCU) 9 controls the transmission 12. The output of the accelerator opening sensor is inputted into the 4WDCU 100.

Each of the front wheels 14R, 14L and rear wheels 15R, 15L has a wheel speed sensor 16R, 16L, 17R, 17L for detecting the wheel speed thereof. In addition, a brake for each wheel is provided with an antilock brake actuator controlled by an antilock brake control unit (ACU) 10.

Each signal may be inputted the 4WD control unit (4WDCU) 100 via an in-vehicle LAN (CAN) bus from an interface of the engine control unit (ECU) 8, transmission control unit (TCU) 9, or other control units.

A high-capacity relay (RLY) 7 is disposed between the high-power generator 2 and the DC motor 5 so that the output from the high-power generator 2 can be cut off as the occasion commands. The opening and closing of the relay 7 is controlled by the 4WDCU 100.

Figure 2:
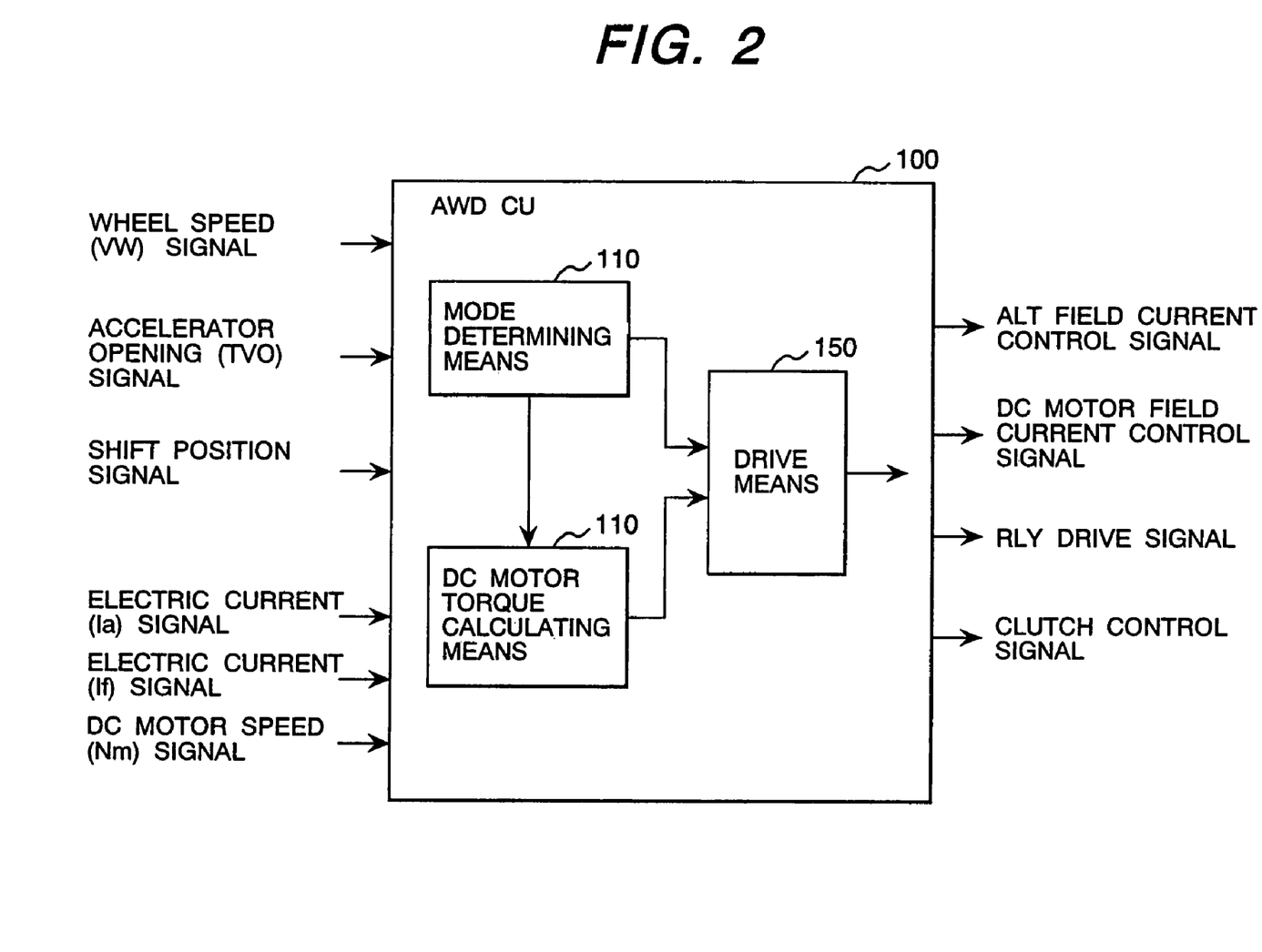
FIG. 2 is a system block diagram showing a structure of a four-wheel drive system of the embodiment of the invention.

A structure of the four-wheel drive system according to the present embodiment will be described by referring to FIG. 2. FIG. 2 is a system block diagram showing the structure of the four-wheel drive system.

The 4WDCU 100 comprises a mode determining means 100, a DC motor torque calculating means 130, and a drive means 150. Various signals, i.e. a wheel speed (VW) signal, an accelerator opening (TVO) signal, a shift position signal, an electric current (Ia) signal, an electric current (If) signal, and a DC motor rotational speed (Nm) signal are inputted to the 4WDCU 100.

The wheel speed (VW) signal consists of a right-front wheel speed VWF_RH, a left-front wheel speed VWF_LH, a right-rear wheel speed VWR_RH, and a left-rear wheel speed VWR_LH, which are respectively detected by the wheel speed sensors 16R, 16L, 17R, 17L. The 4WDCU 100 calculates a rear-wheel mean speed VWR which is an average of the right-rear wheel speed VWR_RH and left-rear wheel speed VWR_LH.

As the accelerator opening (TVO) signal, an output of the accelerator opening sensor as described above is inputted to the 4WDCU 100. The 4WDCU 100 generates an accelerator ON signal when the accelerator opening (TVO) signal indicates that the accelerator opening is equal to or higher than 2% of its full opening, and generates an accelerator OFF signal when the accelerator opening (TVO) signal indicates that the accelerator opening is lower than 2% of its full opening. However, it may be arranged so that a threshold value to determine whether the accelerator is ON is set at 3% while a threshold value to determine whether the accelerator is OFF is set at 1%, so that the threshold values used for the determination of whether the accelerator is ON or OFF is provided with a hysteresis characteristic.

As the shift position signal, an output of a shift position sensor disposed in the vicinity of a shift lever is inputted to the 4WDCU 100. In this embodiment, the shift position signal represents whether the shift lever is positioned at "D" position or other positions.

The electric current (Ia) signal represents an output current of the high-power generator 2 (ALT2) and also a current flowing in the armature coil 5b of the DC motor. The electric current (If) signal represents a field current flowing in the field coil of the DC motor 5. The DC motor rotational speed (Nm) signal is a signal representative of a speed of the DC motor 5.

The 4WDCU 100 outputs an ALT field current control signal for controlling the field current flowing in a field coil of the high-power generator 2 (ATL2), a DC motor field current control signal for controlling the field current flowing in the field coil of the DC motor 5, an RLY drive signal for controlling the opening/closing of the relay 7, and a clutch control signal for controlling the connecting/disconnecting of the clutch 4.

The mode determining means 110 determines a mode of four-wheel drive based on the wheel speed (VW) signal, accelerator opening (TVO) signal, and shift position signal. The mode is determined to be one of the following: (I) 4WD standby mode; (II) creep mode; (III) 4WD control mode; (IV) rotation synchronizing mode; and (V) stop sequence mode.

Figure 3:
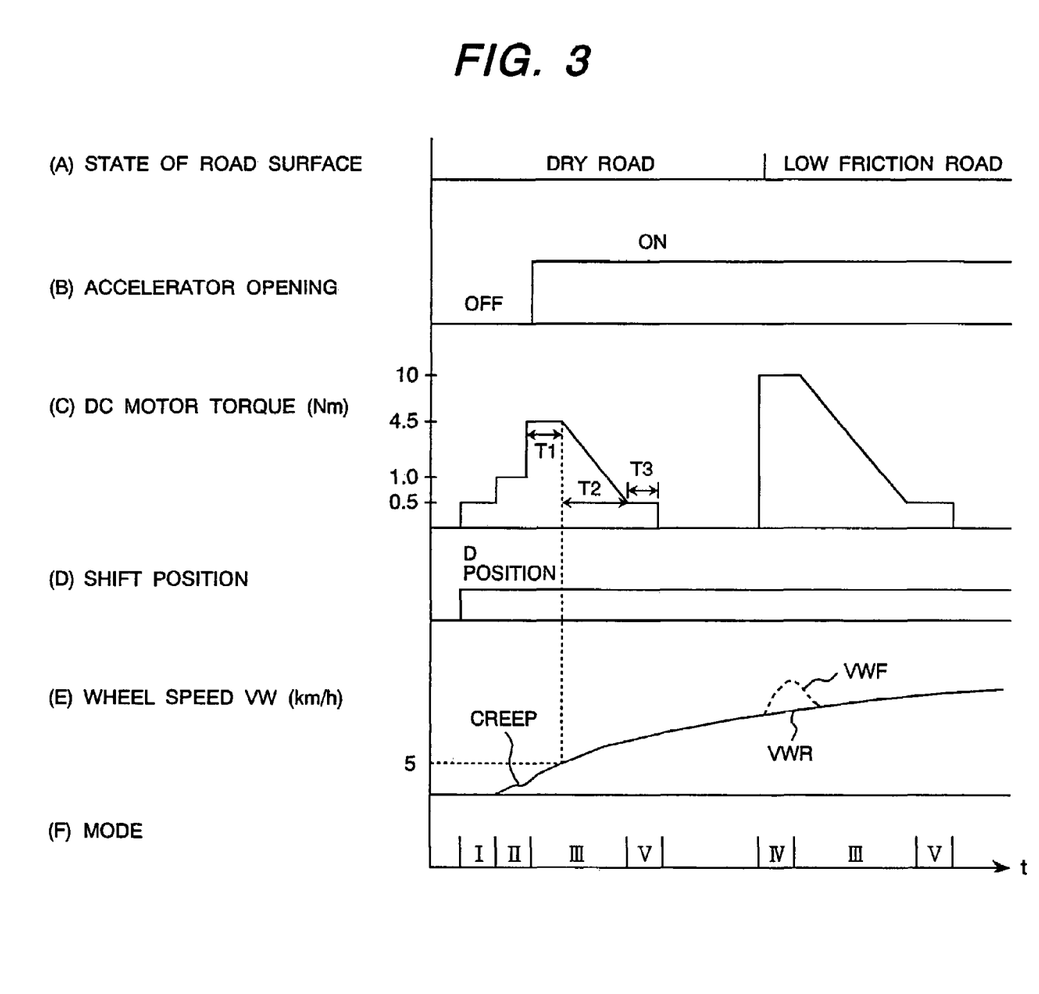
FIG. 3 is a timing chart illustrating an operation of mode determining means of the four-wheel drive system of the embodiment of the invention.

With reference to FIG. 3 also, an operation of the mode determining means 110 in the four-wheel drive system according to the present embodiment will be described.

FIG. 3 shows a timing chart illustrating the operation of the mode determining means in the four-wheel drive system.

The state of road surface is indicated in FIG. 3(A). For instance, a dry road whose surface has a high friction coefficient and a low friction road whose surface has a low friction coefficient are indicated. FIG. 3(B) indicates the accelerator opening. As described above, when the accelerator opening reaches 2% in response to the accelerator opening (TVO) signal, the accelerator ON signal is generated, while when the accelerator opening becomes smaller than 2%, the accelerator OFF signal is generated. FIG. 3(C) indicates the DC motor torque (Nm). FIG. 3(D) indicates the shift position. Based on the output from the shift position sensor, it is determined whether the shift lever is at the "D" position or other positions. FIG. 3(E) indicates the wheel speed VW. Although the wheel speed VW signal consists of a right-front wheel speed VWF_RH, left-front wheel speed VWF_LH, right-rear wheel speed VWR_RH, and left-rear wheel speed VWR_LH, only necessary ones are indicated in FIG. 3(E). FIG. 3(F) indicates modes determined by the mode determining means 110.

When the accelerator opening is OFF as shown in FIG. 3(B), the shift lever is at the drive position as shown in FIG. 3(D), and the wheel speed VW is 0 km/h as shown in FIG. 3(E), the mode determining means 110 determines that the vehicle is in mode (I) (4WD standby mode). The mode determining means 110 then outputs, as a target value of the DC motor torque, 0.5 Nm, for instance, to the drive means 150 shown in FIG. 2. With the output torque of the DC motor 5 being 0.5 Nm, for instance, a slight driving torque is beforehand transmitted to the rear wheels from the DC motor 5 in a standby state, so a quick response is possible the next time the four-wheel drive is necessitated. The drive means 150 outputs the ALT field current control signal so that the target DC motor torque becomes 0.5 Nm, for instance. The detailed description of the drive means 150 will be provided later with reference to FIG. 7.

Then, when there is established a state where the accelerator opening is OFF as shown in FIG. 3(B), the shift lever is at the drive position as shown in FIG. 3(D), and the wheel speed WV is slightly larger than 0 km/h and the vehicle creeps as shown in FIG. 3(E), the mode determining means 110 determines that the vehicle is in mode (II) (creep mode). The mode determining means 110 then outputs, as the target DC motor torque signal, a value which is larger than that outputted in mode (I) (4WD standby mode), for instance, 1.0 Nm, to the drive means 150 shown in FIG. 2. That is, when the vehicle comes to creep with the driving force transmitted to the front wheels from the engine 1, the rear wheels also receive a driving force transmitted from the DC motor 5, so that a state where the vehicle creeps with the front and rear wheels driven is established.

Then, when there is established a state where the accelerator opening is ON as shown in FIG. 3(B), and the shift lever is at the drive position as shown in FIG. 3(D), the mode determining means 110 determines that the vehicle is in mode (III) (4WD control mode). The mode determining means 110 then notifies the DC motor torque calculating means 130 as shown in FIG. 2 that the vehicle is in mode (III) (4WD control mode). The DC motor torque calculating means 130 sets the target DC motor torque at 4.5 Nm, for instance, as shown in FIG. 3(C). The target DC motor torque is maintained at 4.5 Nm until the wheel speed VW as shown in FIG. 3(E) reaches 5 km/h. When the wheel speed has reached 5 km/h, the target DC motor torque is linearly reduced so that the target DC motor torque becomes 0.5 Nm after a predetermined time period T2. When the target torque as shown in FIG. 3(C) has decreased to 0.5 Nm, the mode determining means 110 determines that the vehicle is in mode (V) (stop sequence mode), and holds the target DC motor torque at 0.5 Nm for a predetermined time period T3 and then places the relay 7 and clutch 4 in their off states. And the target DC motor torque is set at 0 Nm. Thus, when the vehicle is started, the engine 1 drives the front wheels, as well as the DC motor 5 drives the rear wheels, so that the four wheels are driven upon starting of the vehicle to improve the starting performance of the vehicle on a low friction road. The above-described sequence is contents of a control performed when the state of the road surface is "dry road" as indicated in FIG. 3(A).

In the low friction road as indicated in FIG. 3(A), when a slip of a wheel occurs, the mode determining means 110 determines that the vehicle is in mode (IV) (rotation synchronizing mode) in which the slip is to be eliminated. Description on this point will be provided later.

A structure of the DC motor torque calculating means 130 in the four-wheel drive system will be described with reference to FIG. 4.

Figure 4:
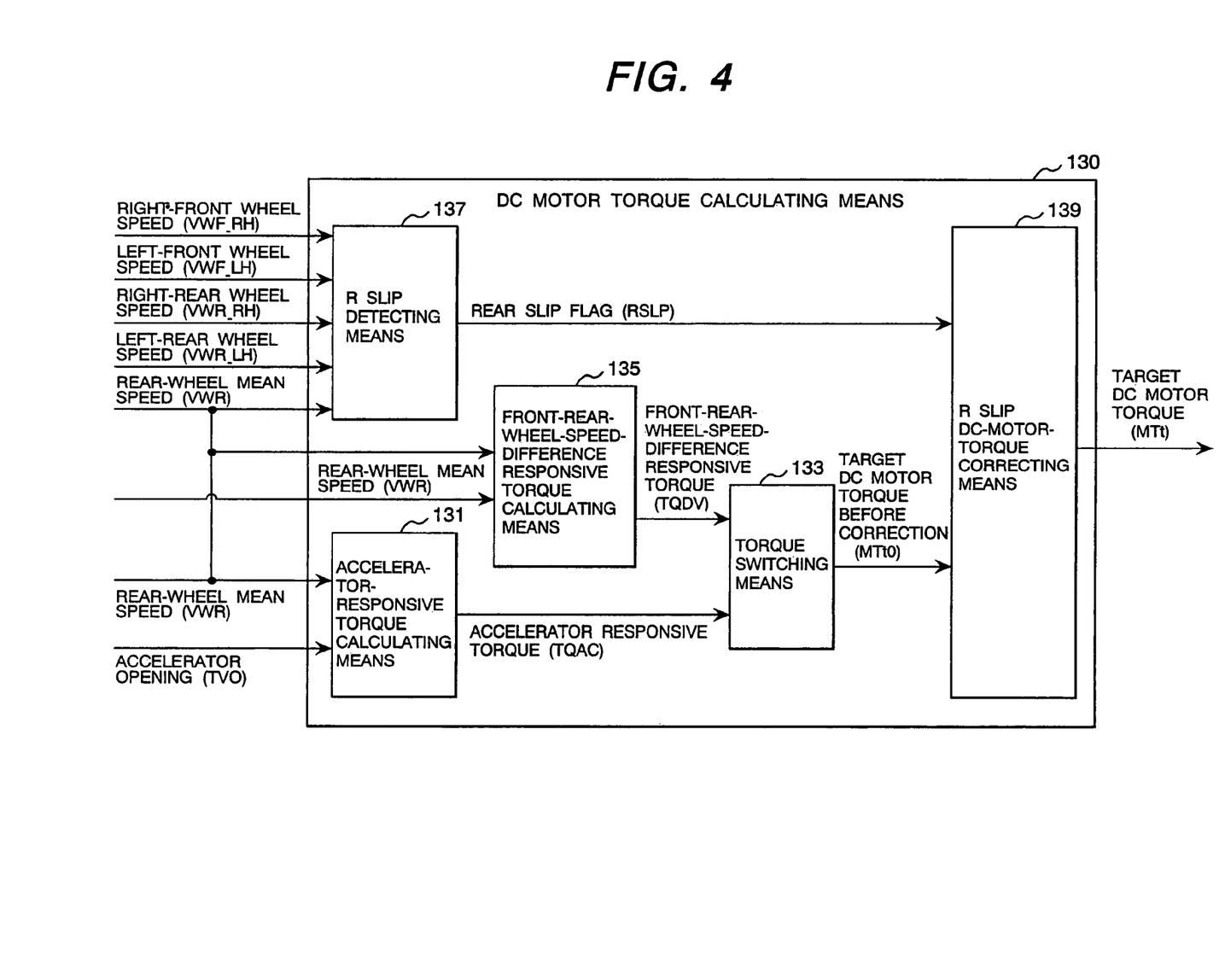
FIG. 4 is a block diagram showing a structure of a DC motor torque calculating means of the four-wheel drive system according to the embodiment of the invention.

FIG. 4 shows a block diagram of a structure of the DC motor torque calculating means 130.

The DC motor torque calculating means 130 comprises an accelerator-responsive torque calculating means 131, a torque switching means 133, a front-rear-wheel-speed-difference responsive torque calculating means 135, an R slip sensing means 137, and an R slip DC-motor-torque correcting means 139.

The accelerator-responsive torque calculating means 131 is a means for calculating the target DC motor torque in the case where the mode determining means 110 determines that the vehicle is in mode (III) (4WD control mode). The front-rear-wheel-speed-difference responsive torque calculating means 135 is a means for calculating the target DC motor torque in the case where a difference between the front wheel speed and the rear wheel speed occurs, in particular in the case where the front wheel speed is higher than the rear wheel speed and the front wheels start slipping. The toque switching means 133 is a means for comparing the target DC motor torque outputted from the accelerator-responsive torque calculating means 131, with the target DC motor torque outputted from the front-rear-wheel-speed-difference responsive torque calculating means 135, and outputting the larger one of the target DC motor torques. In the case where it is determined that the vehicle is in mode (III) (4WD control mode), and also that the state of the road surface is "dry road", the target DC motor torque outputted from the front-rear-wheel-speed-difference responsive torque calculating means 135 is 0 Nm, the output of the torque switching means 133 is the same as that of the accelerator-responsive torque calculating means 131.

The R slip sensing means 137 is a means for sensing that a difference between the front wheel speed and the rear wheel speed occurs, and in particular that the rear wheel speed is higher than the front wheel speed and the rear wheels start slipping. When a slip of the rear wheels is sensed, the R slip DC-motor-torque correcting means 139 corrects the target DC motor torque outputted from the torque switching means 133, so that the slip of the rear wheels is eliminated. In a case where it is determined that vehicle is in mode (III) (4WD control mode), and that the state of the road surface is "dry road" in which a slip of the rear wheels is not sensed, the correction by the R slip DC-motor-torque correcting means 139 is not performed. Thus, the output of the R slip DC-motor-torque correcting means 139 is the same as that of the accelerator-responsive torque calculating means 131.

There will be described, with reference to FIGS. 4 and 5, the target DC motor torque calculated by the accelerator-responsive torque calculating means 131 in the case where it is determined that the vehicle is in mode (III) (4WD control mode).

Figure 5:
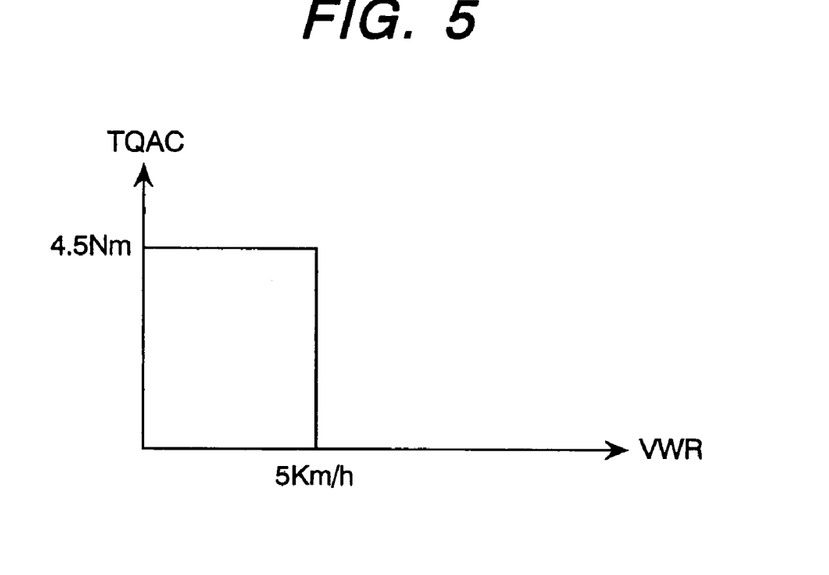
FIG. 5 is a characteristic diagram illustrating an operation of an accelerator-responsive torque calculating means in the DC motor torque calculating means in the four-wheel drive system according to the embodiment of the invention.

FIG. 5 is a characteristic diagram illustrating an operation of the accelerator-responsive torque calculating means in the DC motor torque calculating means of the four-wheel drive system according to the embodiment of the invention.

The rear-wheel mean speed VWR signal and the accelerator opening TVO signal are inputted to the accelerator-responsive torque calculating means 131. The rear-wheel mean speed VWR is a value which is an average of the right-rear wheel speed VWR_RH and left-rear wheel speed VWR_LH.

When the accelerator opening TVO becomes ON, the accelerator-responsive torque calculating means 131 outputs an accelerator responsive torque TQAC corresponding to the rear-wheel mean speed VWR, so that the accelerator responsive torque TQAC is 4.5 Nm when the rear-wheel mean speed VWR is equal to or lower than 5 km/h, and is 0.5 Nm when the rear-wheel mean speed VWR is higher than 5 km/h, as shown in FIG. 5.

Consequently, as described above with reference to FIG. 3, the DC motor torque calculating means 130 sets the target DC motor torque at 4.5 Nm, for instance, as shown in FIG. 3(C), and holds the target DC motor torque at 4.5 Nm until the wheel speed VW as shown in FIG. 3(E) reaches 5 km/h. When the wheel speed VW has reached 5 km/h, the accelerator-responsive torque calculating means 131 linearly reduces the target DC motor torque, so that the target torque becomes 0.5 Nm after the predetermined time period T2.

Referring back to FIG. 3, on the low friction road shown in FIG. 3(A), when a slip of a wheel occurs during the vehicle is running, the mode determining means 110 determines that the vehicle is in mode (IV) (rotation synchronizing mode) in which the slip is to be eliminated. That is, the mode determining means 110 determines that the vehicles is in mode (IV) (rotation synchronizing mode), when a difference between the front wheel speed VWF and the rear wheel speed VWR occurs, and the front wheel speed VWF is higher than the rear wheel speed VWR and the front wheels start slipping, as shown in FIG. 3(E). The rotation synchronizing mode continues until the axle speed synchronizes with the speed of the DC motor.

The front-rear-wheel-speed-difference responsive torque calculating means 135 shown in FIG. 4 calculates the target DC motor torque for eliminating the slip of the front wheels, based on the difference between the front wheel speed VWF and the rear wheel speed VWR.

Figure 6:
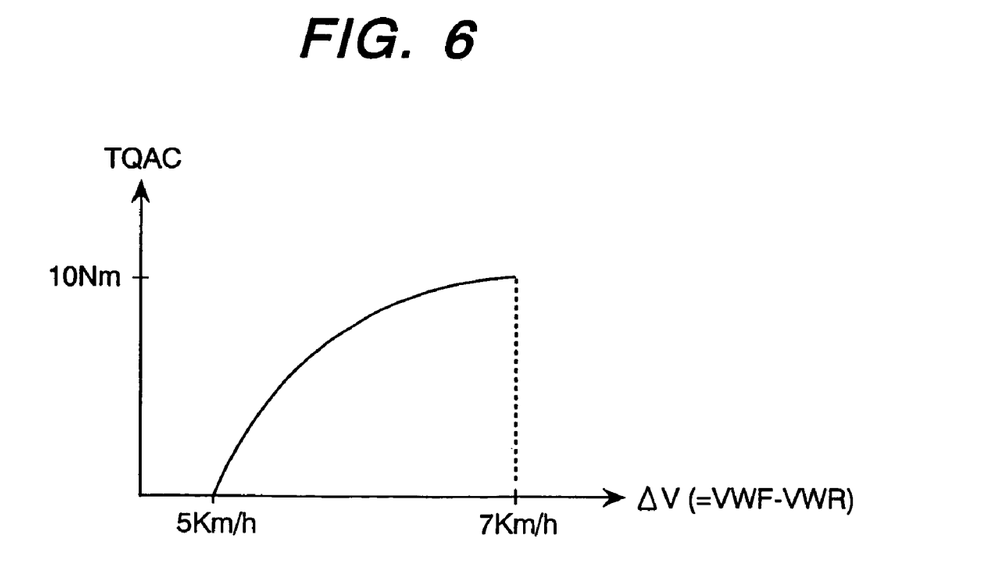
FIG. 6 is a characteristic diagram illustrating an operation of a front-rear-wheel-speed-difference responsive torque calculating means in the DC motor torque calculating means of the four-wheel drive system according to the embodiment of the invention.

Referring to FIGS. 4 and 6, there will be described the target DC motor torque calculated by the front-rear-wheel-speed-difference responsive torque calculating means 135 in the case where the mode determining means 110 determines that the vehicle is in mode (IV) (rotation synchronizing mode).

FIG. 6 is a characteristic diagram illustrating an operation of the front-rear-wheel-speed-difference responsive torque calculating means in the DC motor torque calculating means in the four-wheel drive system according to the embodiment of the invention.

As shown in FIG. 4, to the front-rear-wheel-speed-difference responsive torque calculating means 135 are inputted the rear-wheel mean speed VWR and the front-wheel mean speed VWF. The front-wheel mean speed VWF is a value obtained as an average of the right-front wheel speed VWF_RH and the left-front wheel speed VWF_LH.

The front-rear-wheel-speed-difference responsive torque calculating means 135 outputs a gradually increasing front-rear-wheel-speed-difference responsive torque TQDV signal, based on a difference $\Delta V$ (=VWF−VWR) between the rear-wheel mean speed VWR and the front-wheel mean speed VWF, so that, for instance, the front-rear-wheel-speed-difference responsive torque TQDV is 0 Nm when the front-rear wheel speed difference $\Delta V$ is 2 km/h and thereafter the front-rear-wheel-speed-difference responsive torque TQDV becomes 10 Nm when the front-rear wheel speed $\Delta V$ is 7 km/h, as shown in FIG. 6. The torque switching means 133 compares the output TQAC of the accelerator-responsive torque calculating means 131 with the output TQDV of the front-rear-wheel-speed-difference responsive torque calculating means 135, and the larger one of them is selected as the output of the target torque calculating means 130.

Consequently, as described above with reference to FIG. 3, the DC motor torque calculating means 130 sets the target DC motor torque at 10 Nm, for instance, as indicated in FIG. 3(C). For example, where the vehicle speed is lower than 5 km/h, the output TQAC of the accelerator-responsive torque calculating means 131 is 4.5 Nm, as shown in FIG. 5. Further, where the difference $\Delta V$ (=VWF−VWR) between the rear-wheel mean speed VWR and the front-wheel mean speed VWF is 3 km/h, while the output TQDV of the front-rear-wheel-speed-difference responsive torque calculating means 135 is 5.5 Nm, the output of the torque switching means 133 becomes 5.5 Nm, for instance. This state is continued until the axle speed synchronizes with the speed of the DC motor. When their speeds synchronize, the mode of the vehicle shifts to mode (III) (4WD control mode), and the 4WDCU 100 engages the clutch 4. And when the difference $\Delta V$ (=VWF−VWR) between the rear-wheel mean speed VWR and the front-wheel mean speed VWF becomes lower than 2 km/h, the accelerator-responsive torque calculating means 131 linearly decreases the target DC motor torque, so that the target torque becomes 0.5 Nm after the predetermined time period T2. When the DC motor torque has decreased to 0.5 Nm, the mode of shifts to (V) (stop sequence mode), and after a predetermined time period, 4WDCU 100 places the relay 7 and clutch 4 in their off states.

There will be described a structure of the drive means 150 in the four-wheel drive system of the present embodiment, by referring to FIG. 7.

Figure 7:
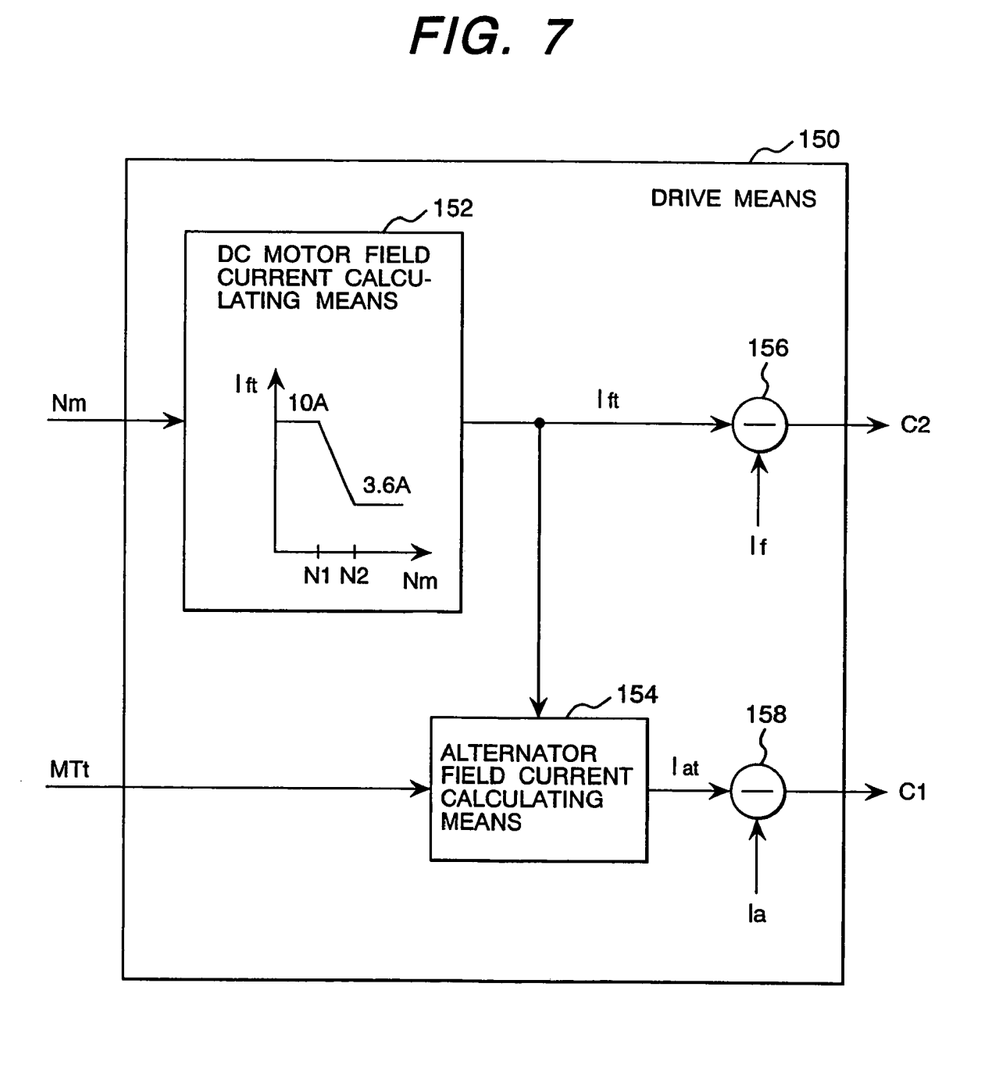
FIG. 7 is a block diagram showing a structure of a drive means in the four-wheel drive system of the embodiment of the invention.

FIG. 7 is a block diagram showing the structure of the drive means of the four-wheel drive system of the embodiment of the invention.

The drive means 150 comprises a DC motor field current calculating means 152, a DC motor armature coil current calculating means 154, and subtracters 156, 158. The DC motor field current calculating means 152 calculates a current to be supplied to the field coil 5a of the DC motor 5, based on the DC motor rotational speed signal Nm inputted into the 4WDCU 100 shown in FIG. 2. The DC motor field current calculating means 152 sets, for instance, the target DC motor field current Ift at 10 A where the DC motor rotational speed Nm is lower than N1, as shown in FIG. 7. Where the DC motor rotational speed Nm is within a range between N1 to N2, the target DC motor field current Ift is gradually decreased from 10 A to 3.6 A. Further, where the DC motor rotational speed Nm is N2 or higher, the target DC motor field current Ift is set at 3.6 A. Thus, when the speed of the DC motor 5 becomes high, a field weakening control is performed, so that the DC motor 5 can operate at a high speed. A difference between the target DC motor field current Ift and the actually detected field current If of the DC motor 5 is got by the subtracter 156, and the current C2 (i.e., a duty ratio of a duty signal for switching a power converter, in this embodiment) supplied to the field coil of the DC motor 5 is controlled so as to zero the difference, thereby performing a feedback control.

The DC motor armature coil current calculating means 154 calculates the current to supply to the DC motor armature coil 5b, based on the target DC motor torque MTt outputted from the target torque calculating means 130 and the target DC motor field current Ift outputted from the DC motor field current calculating means 152, and using a map. A difference between a target alternator field current Iat and an actually detected DC motor armature coil current Ia is detected by the subtracter 158, and the current C1 (i.e., a duty ratio of a duty signal for switching a power converter, in this embodiment) supplied to the field coil of the high-power generator 2 (ALT2) is controlled so as to zero the difference, thereby performing a feedback control.

By referring to FIGS. 8 to 11, there will be described a way of sensing a slip of the rear wheels, and a way of correcting the DC motor torque, in the four-wheel drive system of the embodiment.

First, a structure of the R slip sensing means 137 in the DC motor torque calculating means of the four-wheel drive system will be described, with reference to FIG. 8.

Figure 8:
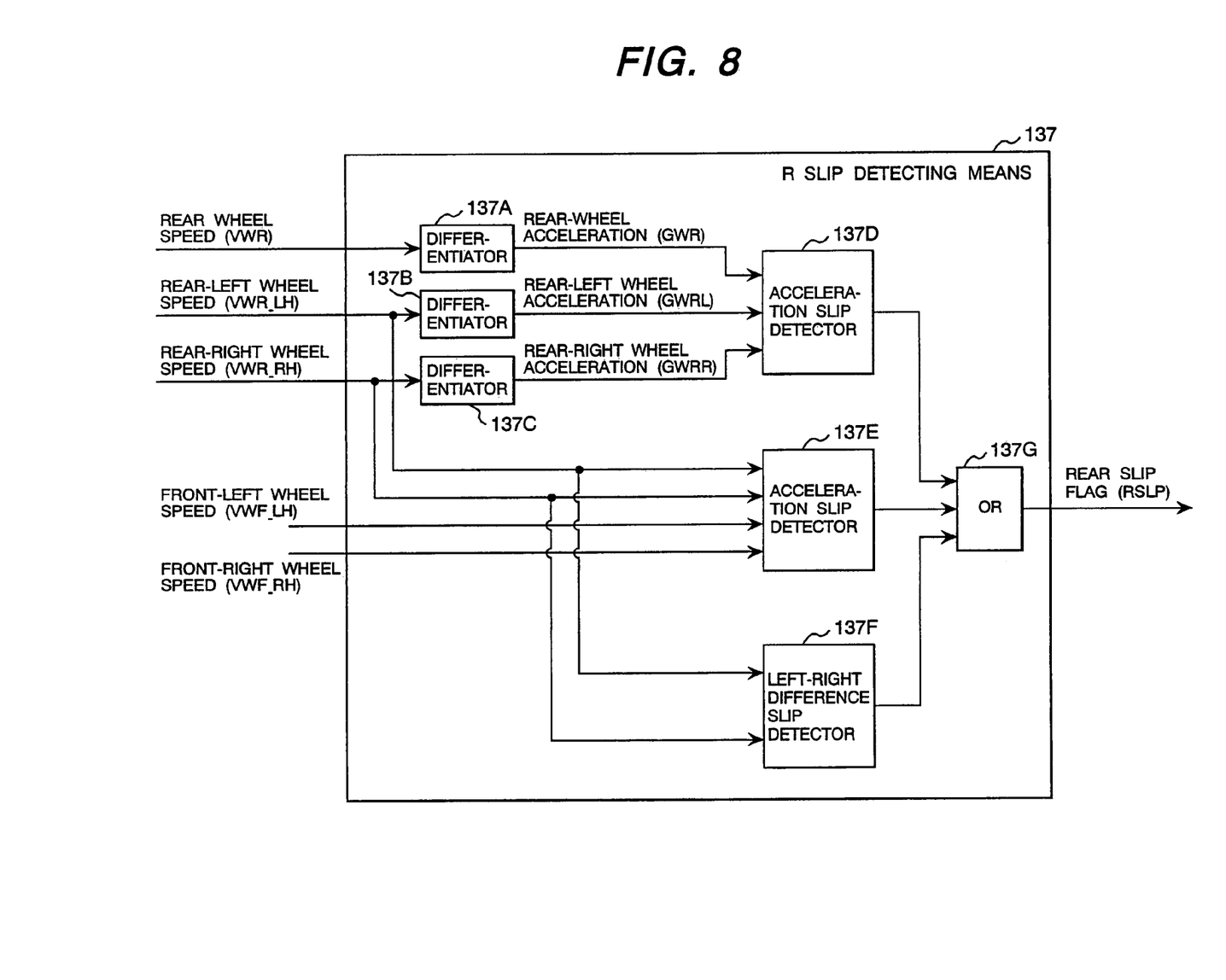
FIG. 8 is a block diagram showing a structure of an R slip sensing means in the DC motor torque calculating means of the four-wheel drive system according to the embodiment of the invention.

FIG. 8 is a block diagram showing the structure of the R slip sensing means.

The R slip sensing means 137 is a means for detecting that there occurs a difference between the front wheel speed and the rear wheel speed, and in particular that the rear wheel speed is higher than the front wheel speed and the rear wheels start slipping.

The R slip sensing means 137 comprises differentiators 137A, 137B, 137C and an acceleration slip sensor 137D, a geometric slip sensor 137E, a left-right difference slip sensor 137F, and an OR circuit 137G.

The differentiator 137A calculates a differential value of the rear wheel speed VWR, i.e., a rear wheel acceleration GWR. When the state of the wheels shifts from a first state where the wheels grip the road surface to a second state, where the wheels are slipping, the wheel speed rapidly increases, namely, the acceleration of the wheels increases when the state shifts. Thus, whether a slip occurs or not can be sensed based on this acceleration. The differentiator 137B calculates a rear-left wheel acceleration GWRL. The differentiator 137C calculates a rear-right wheel acceleration GWRR. The acceleration slip sensor 137D calculates that a slip of the rear wheels occurs when the outputs of the differentiators 137A, 137B, 137C exceed respective predetermined values.

The rear-left wheel speed (VWR_LH), rear-right wheel speed (VWR_RH), the front-left wheel speed (VWF_LH) and the front-right wheel speed (VWF_RH) are inputted to the geometric slip sensor 137E, and the front wheel speed is compared to the rear wheel speed based on these inputs. When a difference between the front and rear wheel speeds occurs, it is determined that a slip occurs at the rear wheels.

The rear-left wheel speed (VWR_LH) and the rear-right wheel speed (VWR_RH) are also inputted to the left-right slip difference detector 137F, and the wheel speeds of the rear-left and rear-right wheels are compared. When a difference between them occurs, it is determined that a slip occurs at the rear wheels.

The OR circuit 137G operates to obtain a logical sum of the outputs of the acceleration slip sensor 137D, geometric slip sensor 137E, and left-right difference slip sensor 137F, and set a rear slip flag (RSLP) indicating that the rear wheels are slipping, where appropriate.

An operation of the R slip DC-motor-torque correcting means 139 in the DC motor torque calculating means will be described by referring to FIGS. 4 and 9 to 11.

Figure 9:
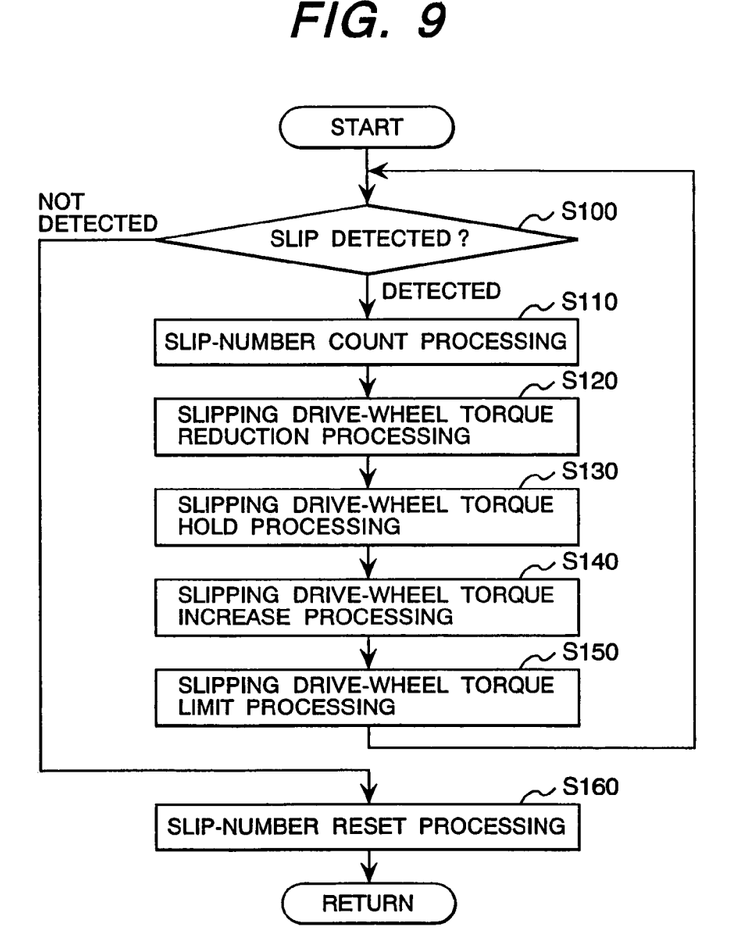
FIG. 9 is a flowchart illustrating an operation of an R slip DC-motor-torque correcting means in the DC motor torque calculating means of the four-wheel system according to the embodiment of the invention.
Figure 10:
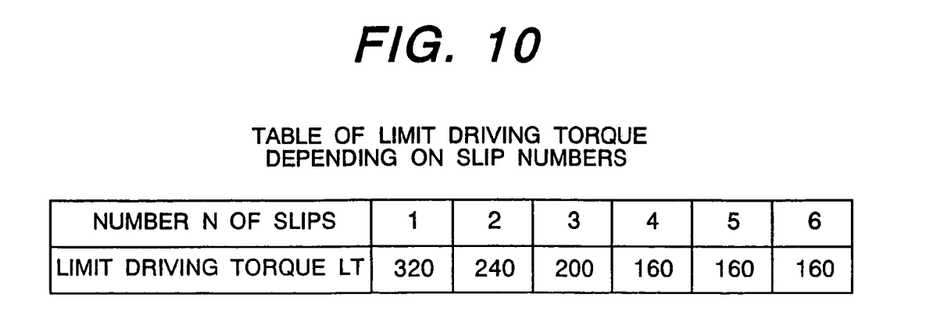
FIG. 10 is an explanatory view showing a torque limit table used by the R slip DC-motor-torque correcting means in the DC motor torque calculating means of the four-wheel drive system according to the embodiment of the invention.

FIG. 9 is a flowchart illustrating an operation of the R slip DC-motor-torque correcting means in the DC motor torque calculating means of the four-wheel drive system. FIG. 10 is an explanatory view of a torque limit table used by the R slip DC-motor-torque correcting means in the DC motor torque calculating means. FIG. 11 is a timing chart illustrating an operation of the R slip DC-motor-torque correcting means in the DC motor torque calculating means.

As shown in FIG. 4, the outputs of the R slip sensing means 137 and the torque switching means 133 are inputted into the R slip. DC-motor-torque correcting means 139. When the R slip sensing means 137 senses a slip of the rear wheels, the R slip DC-motor-torque correcting means 139 corrects the target DC motor torque outputted from the torque switching means 133 so that the slip of the rear wheels is eliminated, as shown in FIG. 9. A drive control routine according to the flowchart of FIG. 9 is repeatedly executed in a predetermined time cycle (e.g., every 10 msec).

In step S100 in the routine of FIG. 9, the R slip DC-motor-torque correcting means 139 determines whether a slip of the rear wheels occurs or not, based on the rear slip flag (RSLP) outputted from the R slip sensing means 137. When a slip of the rear wheels is determined, the flow goes to step S110, while when the slip is not determined, the flow goes to step S160.

Figure 11A:
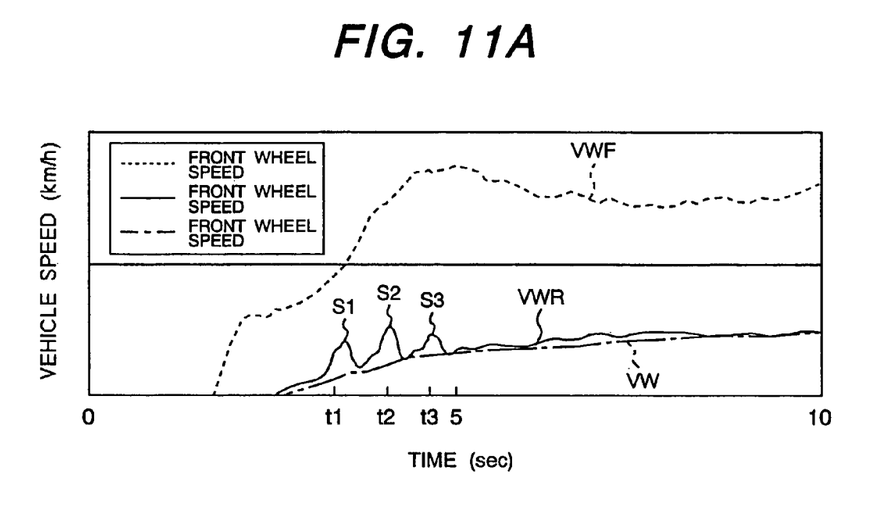
FIG. 11 is a timing chart illustrating an operation of the R slip DC-motor-torque correcting means in the DC motor torque calculating means of the four-wheel drive system according to the embodiment of the invention.

There will be described a case where a slip of the rear wheels is sensed. FIG. 11(A) indicates a state where a slip occurs. In FIG. 11(A), a broken line VWF indicates the front wheel speed, a solid line VWR indicates the rear wheel speed, and a dashed line VW indicates a vehicle speed. In this specific example, it is assumed that the slip of the rear wheels is sensed by the acceleration slip sensor 137D shown in FIG. 8. For instance, when the rear wheel speed VWR rapidly increases, as indicated by slips S1, S2, S3 in a waveform representing the rear wheel speed VWR in FIG. 11(A), it is sensed that a slip of the rear wheels occurs. In such a case, the R slip DC-motor-torque correcting means 139 executes processing of step S110 and the following steps in the control routine of FIG. 9.

In step S110, the R slip DC-motor-torque correcting means 139 executes slip-number count processing, to add one to the count of a slip number counter, so as to count up the number of slips or spinning rotations of the slipping wheel. The count of the slip number counter indicates the cumulative number of slips which have occurs so far.

Figure 11B:
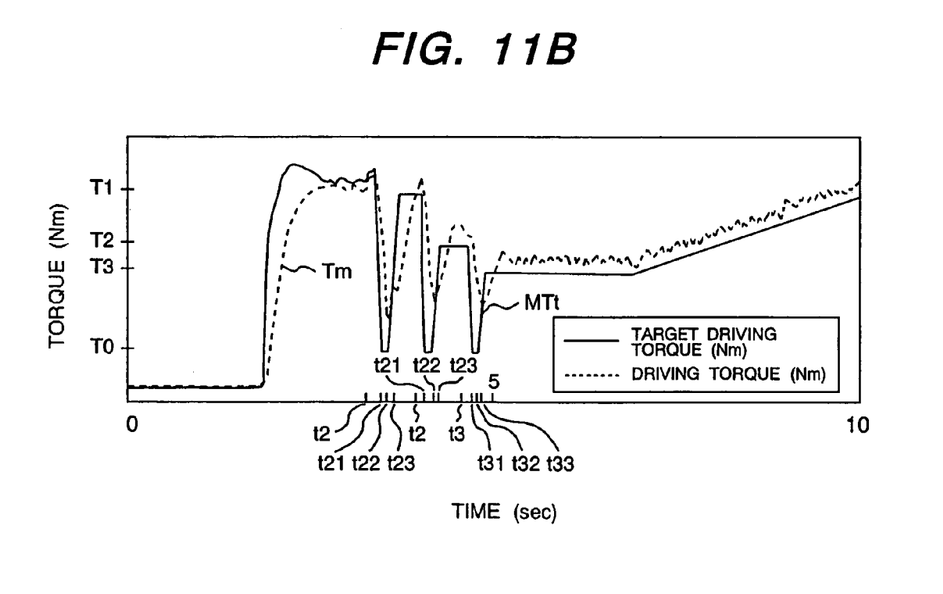

In the next step S120, the R slip DC-motor-torque correcting means 139 executes slipping drive-wheel torque reduction processing. When the rear wheels spin and slip, the driving force of the rear wheels is reduced. Namely, the command value of the output of the high-power generator 2 as issued from the 4WD control unit (4WDCU) 100 to the high-power generator 2 is decreased, to reduce the output of the DC motor 5, thereby reducing the driving force. In FIG. 11(B), the solid line indicates the target value MTt of the driving torque, while the broken line indicates an actual driving torque Tm. For instance, where a slip of the rear wheels is sensed at time t1 indicated in FIG. 11(A), the target value MTt of the driving torque is reduced from time t1, as indicated in FIG. 11(B), so as to execute the slipping drive-wheel torque reduction processing which sets the target torque at T0.

The value to which the driving torque is to be reduced is calculated in advance to ensure that a slip due to a spin will be eliminated. For instance, as long as the road surface on which the vehicle can start or climb is known beforehand, the driving torque T0 of the DC motor 5 can be expressed by the following equation:

$$T0 = W \times D\mu \times TR/G\eta$$

where W, Dμ, η, G, and TR respectively represent the weight of the vehicle, the dynamic friction coefficient, the coefficient of transmission of the driving force, the reduction ratio, and the action radius of the tire.

Therefore, where the value of the driving torque T of the DC motor 5 is smaller than the above-mentioned driving torque T0, it is ensured that the slip due to the spin will be eliminated. The target torque T0 may be 0.3 Nm, for instance.

Then, in step S130 the R slip DC-motor-torque correcting means 139 executes slipping drive-wheel torque hold processing. That is, as shown in FIG. 11(B), the target driving torque T0 of the rear wheels as reduced is held from time t2 to time t3. The holding time Δt (=t3−t2) is, for instance, 0.1 sec. By reducing the target driving torque and further holding the reduced torque for a certain time period, the slip due to the spin can be more reliably eliminated. That is, since there may be a case where the slip due to the spin cannot be eliminated instantly because of the inertia moment of the wheels and others, the reduced driving torque is maintained (held) for a certain time period so as to eliminate the slip more reliably.

In the following step S140, the R slip DC-motor-torque correcting means 139 executes slipping drive-wheel torque increase processing. Namely, as shown in FIG. 11(B), the target driving torque MTt is increased to T1. When the driving torque is thus increased after once reduced, if the driving torque is increased without any limitation, a slip occurs again. Therefore, the driving torque is increased to a value lower than that at the time when the slip due to the spin has been sensed in step S100. By increasing the target driving torque, the running performance of the vehicle can be enhanced. Further, a recurrence of a slip is prevented because the driving torque is increased at a level lower than that at the time when the slip occurs.

In step S140, the R slip DC-motor-torque correcting means 139 executes slipping drive-wheel torque limit processing. In the slipping drive-wheel torque processing, a limit driving torque LT is calculated based on the driving torque limit table shown in FIG. 10 corresponding to the number N of slips as counted in step S110. So the command value of the output of the high-power generator 2 is regulated by the 4WD control unit (4WDCU) 100 so that the driving torque is lower than the limit driving torque LT. Thus, after several times of slips of the slipping wheel, the driving torque is optimized to enable the vehicle to stably run. That is, based on the number of slips counted in step S110, the limited driving torque is decreased with an increase in the number N of slips, so that when the number N of slips is 1, the limit driving torque LT is set at 320 Nm, and when the number N of slips is 2, the limit driving torque LT is set at 240 Nm. As shown in FIG. 11(A), where the first slip S1 occurs, the limit driving torque LT is set at 320 Nm (i.e., torque T1 shown in FIG. 11(A)).

Then, the control flow goes back to step S100 to continue to sense a slip. For instance, as shown in FIG. 11(A), when a second slip occurs, the limit driving torque LT is set at 240 Nm (i.e., torque T2 in FIG. 11(A)) through the processing in step S150 using the limit table shown in FIG. 10. When a third slip occurs thereafter, the limit driving torque LT is set at 200 Nm (i.e., torque T3 in FIG. 11(A)) through the processing in step S150 using the limit table of FIG. 10. Where slips repeatedly occur in this way, the target driving torque MTt is controlled to gradually decrease, thereby the slips can be eliminated more reliably.

Then, where a slip is not sensed in the determination in step S100, the R slip DC-motor-torque correcting means 139 executes slip-number reset processing to clear the number N of slips to 0, in step S160.

The clearing the number N of slips can be implemented so that the number N is cleared after the driving torque is increased, and when the output of the accelerator opening sensor indicates an opening of 0%, when a slip due to a spin has not occurred for a predetermined time period, or when the friction coefficient of the road surface has increased from a low value to a normal value. The driving torque as has been limited is increased after the clearing the number N of slips.

In the processing of step S120 described above, the output torque of the DC motor 5 is reduced to reduce the driving force of the rear wheels which are slipping due to a spin. However, the clutch 4 may be disconnected to mechanically decouple the DC motor 5 from the axle. In this case, the driving force is temporarily lowered to 0 Nm.

The way of reducing the driving force of the wheels slipping due to a spin may be carried out so that the driving force is reduced at a constant gradient, but the driving force is preferably rapidly reduced to inhibit the slip due to the spin.

The way of reducing the DC motor torque may be carried out so that the DC motor torque is reduced until the slip due to the spin disappears, which is detemined by using the determination of whether a slip exists in step S100.

In the processing of step S130 described above, the torque which has been reduced is held for a certain time period. However, the reduced torque may be held until the slip due to the spin disappears, that is, until the rear-wheel acceleration GWR becomes 0, which is determined by using the determination of whether a slip exists in step S100. It is noted that if the slip due to the spin can be eliminated by reducing the driving torque, it is not necessary to maintain (hold) the reduced driving torque.

In the processing of step S140 described above, the driving torque may be increased at a constant gradient. However, the driving torque is preferably rapidly increased to immediately inhibit the slip due to the spin.

As described above, according to the control method of the present embodiment, the driving force as indicated in FIG. 11(B) is obtained in the running on the low friction road, inhibiting a slip and assuring effective traction. Thus, the vehicle can stably run.

According to the invention, in a four-wheel drive: system, a driving torque is inhibited from becoming insufficient upon occurrence of a slip, thereby improving the running performance.

What is claimed is:

1. A four-wheel drive system for controlling driving of four wheels of a four-wheel drive vehicle where torque is distributable to front wheels and rear wheels, the system comprising:
   a slip sensing means for sensing a slip of rear wheels due to a spin thereof, and
   a torque correcting means for correcting a torque on the rear wheels so that a driving force of the rear wheels whose slip is sensed by the slip sensing means is reduced and then increased,
   wherein the torque correcting means operates to reduce the driving torque of the rear wheels until the driving torque reaches to a lower level where the slip is eliminated when the slip of the rear wheels is sensed,
   wherein the torque correcting means operates to keep the reduced driving torque until the slip is eliminated and then to increase the driving torque when the slip of the rear wheels is sensed, and
   wherein the torque correcting means, after eliminating the slip, operates to increase the driving torque lower than a value which the driving torque has taken at the time of occurrence of the slip.

2. A four-wheel drive system for controlling driving of four wheels of a four-wheel drive vehicle where torque is distributable to front wheels and rear wheels, the system comprising:
   a slip sensing means for sensing a slip of rear wheels due to a spin thereof, and
   a torque correcting means for correcting a torque on the rear wheels so that a driving force of the rear wheels whose slip is sensed by the slip sensing means is reduced and then increased,
   wherein the torque correcting means operates to reduce the driving torque of the rear wheels until the driving torque reaches to a lower level where the slip is eliminated when the slip of the rear wheels is sensed,
   wherein the torque correcting means operates, when the slip of any of the rear wheels is sensed, to keep the driving torque as reduced for a predetermined time period and then to increase the driving torque, and
   wherein the torque correcting means, after eliminating the slip, operates to increase the driving torque lower than a value which the driving torque has taken at the time of occurrence of the slip.

3. A four-wheel drive system for controlling driving of four wheels of a four-wheel drive vehicle where torque is distributable to front wheels and rear wheels, the system comprising:
   a slip sensing means for sensing a slip of rear wheels due to a spin thereof, and
   a torque correcting means for correcting a torque on the rear wheels so that a driving force of the rear wheels whose slip is sensed by the slip sensing means is reduced and then increased,
   wherein the torque correcting means operates to reduce the driving torque of the rear wheels until the driving torque reaches to a lower level where the slip is eliminated when the slip of the rear wheels is sensed,
   wherein the torque correcting means operates to keep the reduced driving torque until the slip is eliminated and then to increase the driving torque when the slip of the rear wheels is sensed, and
   wherein the torque correcting means, at the increasing process of the driving torque, operates to increase that up to a predetermined limit value depending on the number of spinning rotations of the rear wheels and to allow repetition of the slip due to the spin and a grip so that a continuous slip is inhibited.

4. A four-wheel drive system for controlling driving of four wheels of a four-wheel drive vehicle where torque is distributable to front wheels and rear wheels, the system comprising:
   a slip sensing means for sensing a slip of rear wheels due to a spin thereof, and
   a torque correcting means for correcting a torque on the rear wheels so that a driving force of the rear wheels whose slip is sensed by the slip sensing means is reduced and then increased,
   wherein the torque correcting means operates to reduce the driving torque of the rear wheels until the driving torque reaches to a lower level where the slip is eliminated when the slip of the rear wheels is sensed,
   wherein the torque correcting means operates, when the slip of any of the rear wheels is sensed, to keep the driving torque as reduced for a predetermined time period and then to increase the driving torque, and
   wherein the torque correcting means, at the increasing process of the driving torque, operates to increase that up to a predetermined limit value depending on the number of spinning rotations of the rear wheels and to allow repetition of the slip due to the spin and a grip so that a continuous slip is inhibited.

5. A drive system for a four-wheel drive vehicle in which one of front wheels and rear wheels is driven by an internal combustion engine, and the other of the front wheels and rear wheels is driven by an electric motor, comprising:
   a slip sensing means for sensing a slip of motor-driven wheels, and
   a torque correcting means for correcting a driving torque supplied from the electric motor to the motor-driven wheels,
   wherein the torque correcting means is configured to correct the driving torque so as to repeat actions of reducing the driving torque and then increasing the driving torque under a state of a road surface where the slip is sensed repeatedly until the slip is eliminated.

6. The drive system according to claim 5, wherein the torque correcting means is configured to repeat actions of reducing the driving torque, keeping the reduced driving torque for a predetermined time period, and then increasing the driving torque again, under the state of the road surface where the slip is sensed.

7. The drive system according to claim 5, wherein the torque correcting means is configured, when increasing the driving torque after reducing the driving torque under the state of the road surface where the slip is sensed, to increase the driving torque at a level lower than that before being reduced.

8. The drive system according to claim 5, wherein the torque correcting means is configured, when reducing the driving torque under the state of the road surface where the slip is sensed, to reduce the driving torque up to 0 Nm.

9. The drive system according to claim 5, wherein the torque correcting means is configured to set predetermined droving torque-limit values in accordance with the number of slips and increase the driving torque up to a predetermined limit value depending on the number of slips when increasing the driving torque after reducing the driving torque under the state of the road surface where the slip is sensed.

* * * * *